(12) United States Patent
Cao et al.

(10) Patent No.: US 9,977,314 B1
(45) Date of Patent: May 22, 2018

(54) LIGHT-PIPE ADJUSTING APPARATUS

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventors: Xiuyan Cao, Qingdao (CN); Wensheng Lu, Qingdao (CN)

(73) Assignees: HISENSE CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 0 days. days.

(21) Appl. No.: 15/459,958

(22) Filed: Mar. 15, 2017

(30) Foreign Application Priority Data

Nov. 18, 2016 (CN) .......................... 2016 1 1028957

(51) Int. Cl.
| | |
|---|---|
| *G03B 21/14* | (2006.01) |
| *G02B 7/00* | (2006.01) |
| *G02B 27/09* | (2006.01) |
| *F21V 8/00* | (2006.01) |
| *G02B 26/08* | (2006.01) |
| *G03B 21/20* | (2006.01) |

(52) U.S. Cl.
CPC ......... *G03B 21/142* (2013.01); *G02B 6/0096* (2013.01); *G02B 7/004* (2013.01); *G02B 26/0833* (2013.01); *G02B 27/0994* (2013.01); *G03B 21/145* (2013.01); *G03B 21/208* (2013.01); *G03B 21/2066* (2013.01)

(58) Field of Classification Search
CPC .......................... G03B 21/145; G03B 21/208; G03B 21/2066; H04N 9/3141; H04N 9/3152; G02B 6/002; G02B 6/0018; G02B 6/0096
See application file for complete search history.

(56) References Cited

U.S. PATENT DOCUMENTS

| | | | |
|---|---|---|---|
| 2007/0115437 A1* | 5/2007 | Shouji ................... | G03B 21/18 353/57 |
| 2007/0121080 A1* | 5/2007 | Hsu ..................... | G03B 21/2046 353/52 |
| 2012/0099324 A1* | 4/2012 | Robitaille .......... | G02B 27/0994 362/294 |

\* cited by examiner

*Primary Examiner* — Sultan Chowdhury
(74) *Attorney, Agent, or Firm* — J.C. Patents

(57) ABSTRACT

The present application provides a light-pipe adjusting apparatus comprising: a first support; a light-pipe component, slidably connected to the first support via a first rail; and a first drive device, provided on the first support and connected to the light-pipe component for driving the light-pipe component to slide along the first rail. The present application can improve the accuracy and reliability of the position adjustment of the light-pipe component.

14 Claims, 6 Drawing Sheets

LIGHT-PIPE ADJUSTING APPARATUS

CROSS REFERENCE TO RELATED APPLICATION

This application claims priority to Chinese Patent Application No. 201611028957.2, filed on Nov. 18, 2016 and entitled "Light-Pipe Adjusting Apparatus", the content of which is incorporated by reference in its entirety.

TECHNICAL FIELD

The present application relates to optical device technology, and more particularly to a light-pipe adjusting apparatus.

BACKGROUND

Light-pipe is a common light-homogenizing element, which is used to homogenize light beam. The light-pipe includes a tube which is covered with a reflection layer. When enters the light-pipe, the light beam is reflected repeated in the tube, therefore the enterned light beam is homogenized. In the optical-mechanical system, the light beam from the light source optical structure first enters into the light-pipe for homogenizing and then enters into the digital micromirror device (DMD) illuminating optical path. When the light-pipe deviates from a predetermined position or the light-outputting position of the light source optical structure is adjusted, the position of the light-pipe needs to be adjusted by using the light-pipe adjusting apparatus to ensure light-homogenizing effect.

Referring to FIG. 1, the light-pipe adjusting apparatus in the related art includes a pipe body 101, an adjusting system, and a light-pipe 102. The adjusting system includes an elastic member 103 and a bolt 104. Herein, the elastic member 103 is provided in the pipe body 101, the bolt 104 is connected to a screw hole of the pipe body 101 and can extend into the pipe body 101 along a radial direction of the pipe body 101, the bolt 104 is provided in the same direction as the elastic member 103, and the light-pipe 102 is inserted in the pipe body 101 and sandwiched between the elastic member 103 and the bolt 104. The light-pipe 102 can be positioned by the clamping action between the bolt 104 and the elastic member 103, and the bolt 104 can radially extend and contract by rotating the bolt 104, so as to adjust the relative position of the light-pipe 102 and the pipe body 101, and further adjust the position of the light-pipe 102 in the optical path, thereby ensuring the light-homogenizing effect.

SUMMARY

The present application provides a light-pipe adjusting apparatus.

The present application provides a light-pipe adjusting apparatus, including:
a first support;
a light-pipe component, slidably connected to the first support by a first rail;
a first drive device, provided on the first support and connected to the light-pipe component for driving the light-pipe component to slide along the first rail.

The present application also provides an optical-mechanical system, including: a light source optical structure, a light-pipe component, a reflector, a digital micromirror device (DMD), a projection lens, and a light-pipe adjusting apparatus; the light-pipe adjusting apparatus, is configured to adjust position of the light-pipe component according to light-outputting position of the light source optical structure, thereby allowing a light beam emitted from the light source optical structure to enter into a light-pipe of the light-pipe component for homogenizing; and the homogenized light beam enters into the illuminating optical path of the DMD via the reflector, so as to enter into the projection lens via the illuminating optical path of the DMD.

REFERENCE NUMERALS

Related Art

101: pipe body; 102: light-pipe; 103: elastic member; 104: bolt.

The Present Application

201: first support; 202: light-pipe component; 203: first rail;
204: first drive device; 205: protective sleeve; 206: first rack;
207: first shaft; 208: first gear; 209: first positioning bolt;
210: first dovetail joint; 211: first dovetail groove; 212: second support;
213: second drive device; 214: second rack; 215: second rotating shaft;
216: second gear; 217: second positioning bolt; 218: second rail;
219: first positioning member; 220: first support member; 221: second support member;
222: third support member; 223: first groove; 224: first through hole;
225: sleeve body; 226: second positioning member; 227: second dovetail joint;
228: second dovetail groove; 229: second groove; 230: second through hole;
231: light source optical structure; 232: reflector; 233: DMD;
234: projection lens.

DESCRIPTION OF EMBODIMENTS

Figure 1:
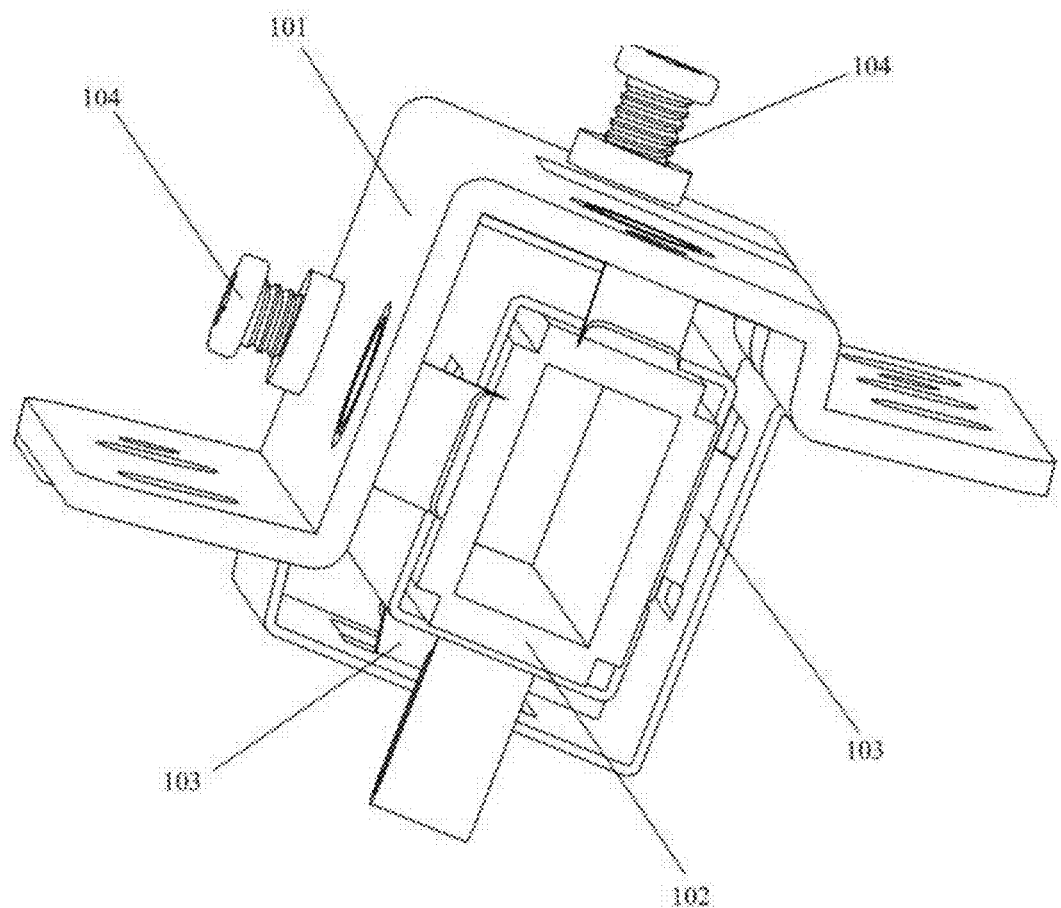
FIG. 1 is a schematic structural diagram of a light-pipe adjusting apparatus in the related art.
Figure 2:
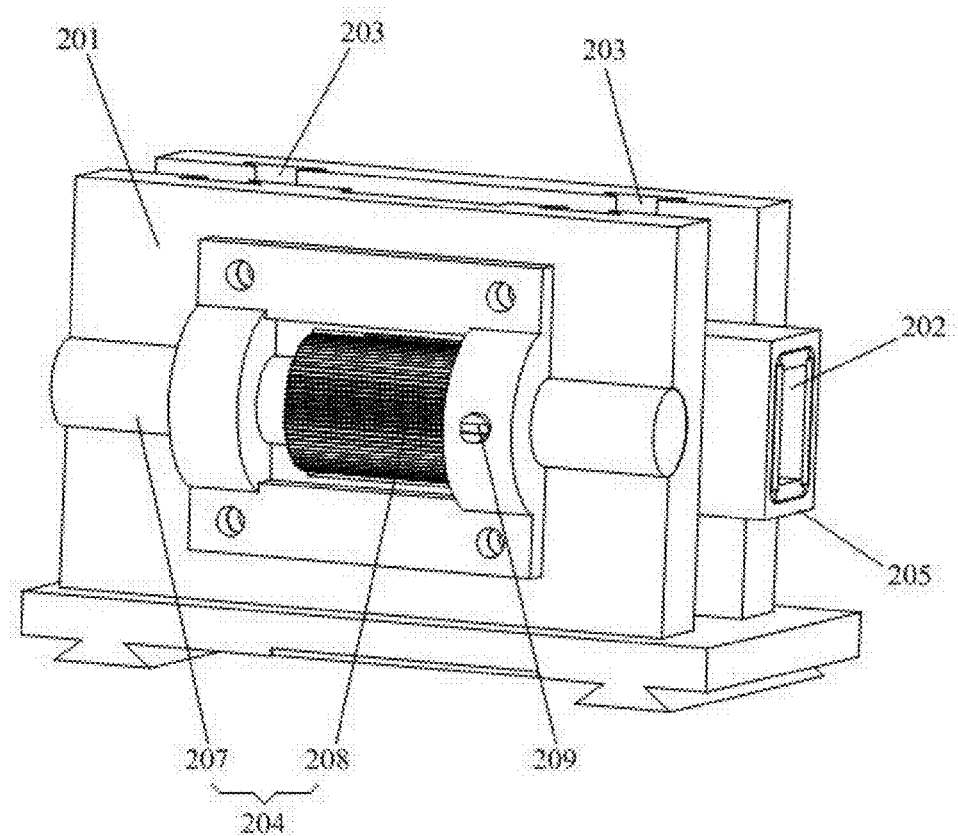
FIG. 2 is a schematic structural diagram of a light-pipe adjusting apparatus provided in some embodiments of the present application.
Figure 3:
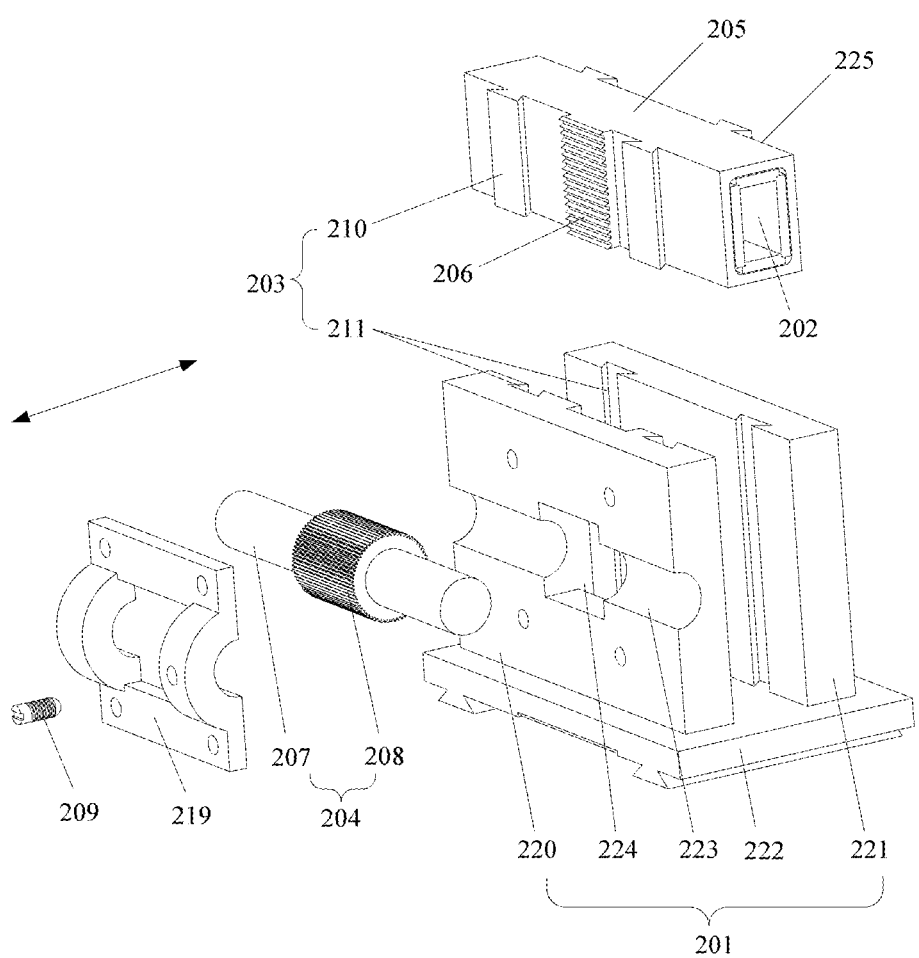
FIG. 3 is an exploded structural diagram of a light-pipe adjusting apparatus provided in some embodiments of the present application.

Referring to FIG. 2 and FIG. 3, a light-pipe adjusting apparatus provided in some embodiments of the present application includes: a first support 201; a light-pipe component 202, slidably connected to the first support 201 via a first rail 203; a first drive device 204, provided on the first support 201 and connected to the light-pipe component 202 for driving the light-pipe component 202 to slide along the first rail 203.

In some embodiments of the present application, when the position of the light-pipe component 202 needs to be adjusted, the light-pipe component 202 can be driven to slide along the first rail 203 via the first drive device 204. The light-pipe component 202 accurately moves along the designed path without deflecting under the guide of the first rail 203, thereby the accuracy and reliability of the position adjustment of the light-pipe component 202 is improved. When the light-pipe adjusting apparatus provided in some embodiments of the present application is applied in a projection device to adjust the position of the light-pipe component 202, since the light-pipe component 202 can move accurately along the designed path without deflection, the ribbon shadow on an edge of the projection screen can be effectively avoided and the quality of the projection screen can be improved.

In some embodiments of the present application, the first drive device 204 may include a first rotation member which is rotationally connected to the first support 201 and is in contact with the light-pipe component 202. The first rotation member is rotatable relative to the first support 201, so as to drive the light-pipe component 202 to slide along the first rail 203. Since the light-pipe component 202 can be driven to slide along the first rail 203 by the rotation of the first rotation member, a structure of the first drive device 204 is simplified, and making the first drive device 204 simple in operation and reliable in driving.

In some embodiments of the present application, the light-pipe component 202 may include a protective sleeve 205. The protective sleeve 205 sleeves on a light-pipe of the light-pipe component 202, so that the light-pipe component 202 can slide along the first rail 203 via the protective sleeve 205. The protective sleeve 205 is provided with a first rack 206. The first rack 206 is arranged in parallel with the first rail 203, and stripes of the first rack 206 are perpendicular to the first rail 203. The first rotation member includes a first shaft 207 and a first gear 208. The first gear 208 sleeves on the first shaft 207 and meshes with the first rack 206. The first shaft 207 is provided perpendicularly to the first rail 203, and the first gear 208 is rotationally connected to the first support 201 via the first shaft 207. The first gear 208 rotates about the first shaft 207, so that the light-pipe component 202 can slide along the first rail 203 via the first rack 206. Therefore, the light-pipe component 202 can slide along the first rail 203 by rotating the first gear 208 to adjust the position of the light-pipe component 202, simplifying the structure of the first drive device 204 and making the first drive device 204 simple in operation and reliable in driving. In addition, the first rotation member may be a rotation member such as a roller, a screw, or the like.

In some embodiments of the present application, the light-pipe adjusting apparatus further comprises a first positioning bolt 209 and a positioning member 219. The first positioning member 219 is provided on the first support 201 via the first positioning bolt 209. The first gear 208 is fixed relative to the first shaft 207 and rotationally connected to the first support 201. The first positioning bolt 209 is used to extend and contract in a radial direction of the first shaft 207, thereby allowing the first positioning member 219 to contact and hold the first shaft 207 and to position the first shaft 207 relative to the first support 201. Thus, following the position adjustment of the light-pipe component 202, the first shaft 207 can be positioned relative to the first support 201 by tightening the first positioning bolt 209, to position the first gear 208 relative to the first support 201, and further to position the light-pipe component 202 relative to the first support 201.

In some embodiments of the present application, the first rail 203 includes a first dovetail joint 210 and a first dovetail groove 211. The first dovetail joint 210 is slidably provided within the first dovetail groove 211. Herein, the first dovetail joint 210 may be provided on the protective sleeve 205, and the first dovetail groove 211 may be provided on the first support 201. Alternatively, the first dovetail joint 210 is provided on the first support 201, and the first dovetail 211 is provided on the protective sleeve 205. The separation of the light-pipe component 202 from the first support 201 can be prevented by the limit action of the first dovetail joint 210 and the first dovetail groove 211, thereby enhancing the reliability of the light-pipe adjusting apparatus.

Illustratively, taking the first dovetail joint 210 being provided on the protective sleeve 205, the first dovetail groove 211 being provided on the first support 201, and the first rotation member including a first shaft 207 and a first gear 208 as example, then as one possible implementation, the first support 201 may include a first support member 220, a second support member 221 and a third support member 222. Herein, a surface of the third support member 222 is provided with the first support member 220 and the second support member 221 which are parallel to each other. The first dovetail grooves 211 are both provided on a surface of the first support member 220 opposite to the second support member 221, as well as a surface of the second support member 221 relative to the first support member 220, where the respective positions of the first dovetail grooves 211 on the first support member 220 and on the second support member 221 are the same. The protective sleeve 205 is provided with the first dovetail joint 210 corresponding to the first dovetail groove 211, and the light-pipe component 202 can slide along the first dovetail groove 211 via the first dovetail joint 210. Another surface of the first support member 220 away from the second support member 221 is provided with a first groove 223 adapting to the first rotation member, and the first groove 223 and the first dovetail groove 211 are perpendicular to each other. When the first rotation member is provided on the first support 201 via the first groove 223, the first support member 220 is provided with a first through hole 224 at a position corresponding to the first gear 208 of the first rotation member, thereby allowing the first gear 208 to mesh with the first rack 206 via the first through hole 224. Thus, the light-pipe component 202 sleeved by the protective sleeve 205 can slide along the first dovetail joint 210 to adjust the position of the light-pipe component 202, simplifying the structure of the first support 201 and making the first drive device 204 simple in operation and reliable in driving.

The protective sleeve 205 may include a hollow sleeve body 225, the hollow sleeve body 205 sleeves on the light-pipe of the light-pipe component 202. The first dovetail joint 210 corresponding to the first dovetail groove 211 of the first support member 220 is provided on a surface of the sleeve body 225 opposite to the first support member 220. The first dovetail joint 210 corresponding to the first dovetail groove 211 of the second support member 221 is provided on a surface of the sleeve body 225 opposite to the second support member 221. A first rack 203 is provided at a position corresponding to the first through hole 224 on the surface of the sleeve body 225 opposite to the first support member 220, thereby allowing the light-pipe component 202 sleeved by the sleeve body 225 to slide along the first dovetail groove 211 via the first dovetail joint 210 to adjusting the position of the light-pipe component 202, and simplifying the structure of the protective sleeve 205.

Figure 4:
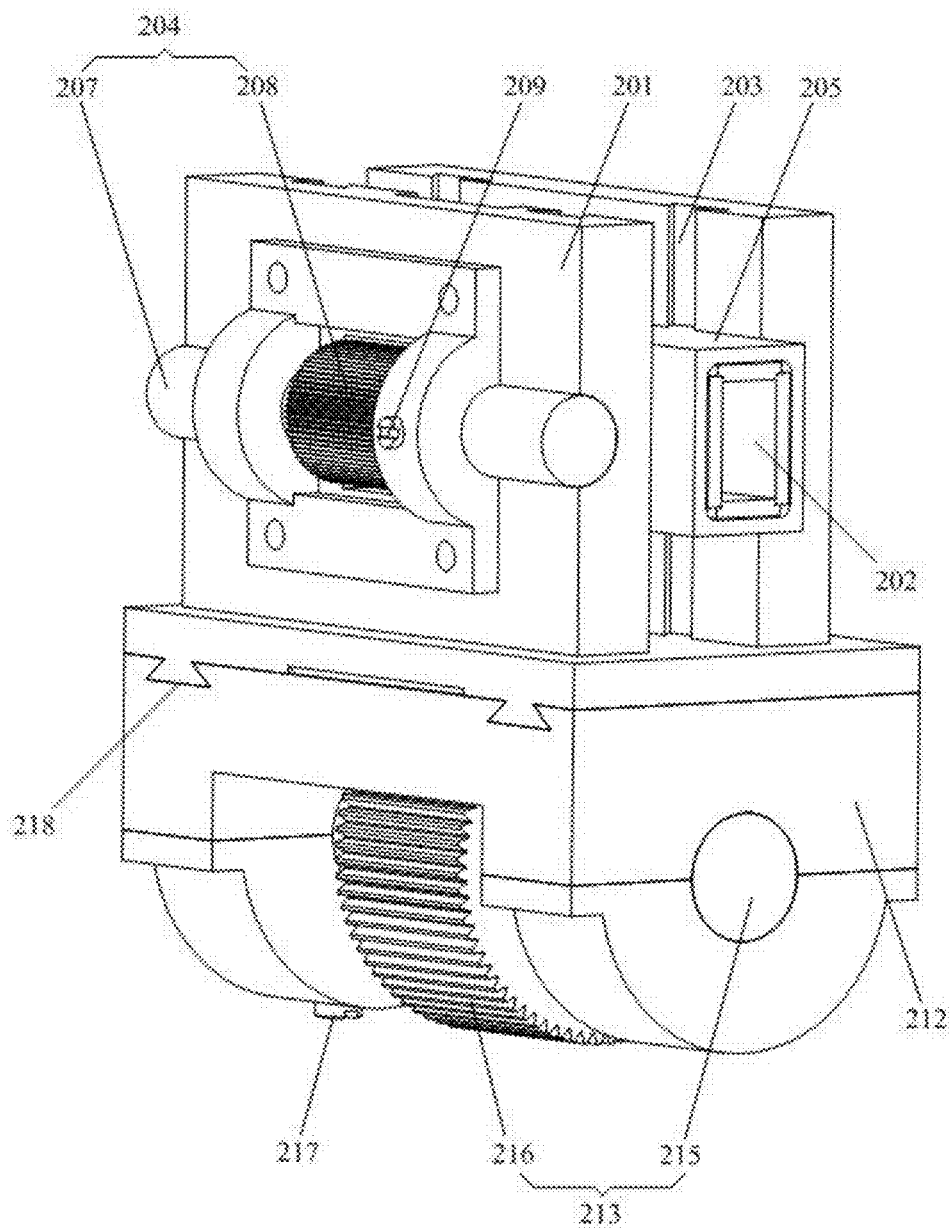
FIG. 4 is a schematic structural diagram of a light-pipe adjusting apparatus provided in some embodiments of the present application.
Figure 5:
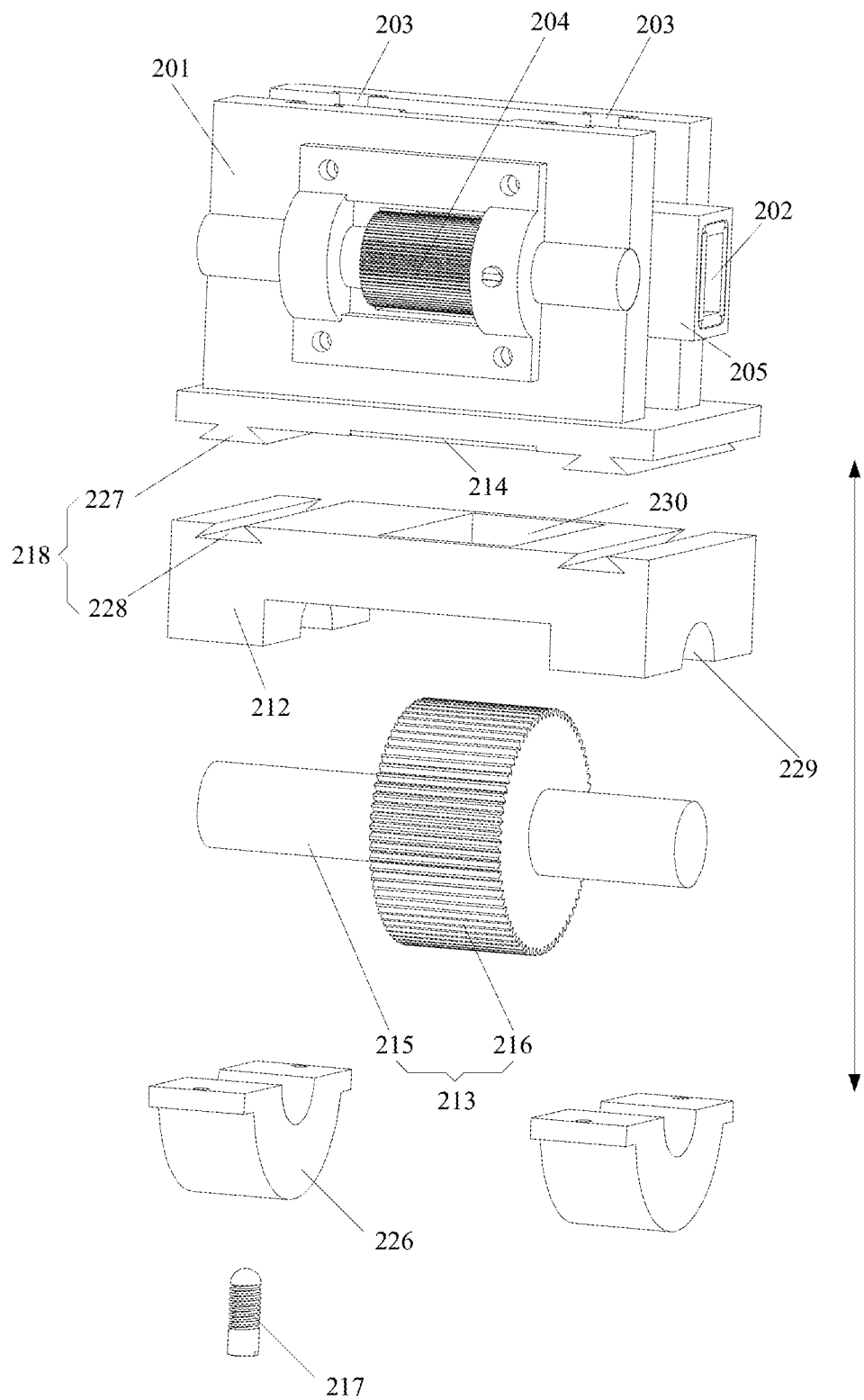
FIG. 5 is an exploded structural diagram of a light-pipe adjusting apparatus provided in some embodiments of the present application.

Referring to FIG. 4 and FIG. 5, in some embodiments of the present application, the light-pipe adjusting apparatus may further include a second support 212 and a second drive device 213. The first support 201 is slidably connected to the second support 212 via a second rail 218, a direction of which is perpendicular to that of the first rail 203. The second drive device 213 is provided on the second support 212 and connected to the first support 201, and the second drive device 213 is used to drive the first support 201 to slide along the second rail 218. The first support 201 is driven to slide along the second rail 218 via the second drive device 213, so that the first support 201 drives the light-pipe component 202 to slide along the second rail 218. Since the direction of the second rail 218 is perpendicular to that of the first rail 203, thus, the position of the light-pipe component 202 in two mutually perpendicular directions can be adjusted. And with the guiding effect of the second rail 218, the light-pipe component 202 can move accurately along the designed path without deflection, thereby improving the accuracy and reliability of the position adjustment of the light-pipe component 202. In addition, since the light-pipe component 202 can move independently along the first rail 203, and the first support 201 can move independently along the second rail 218, thereby allowing independent adjustment of the light-pipe component 202 in different dimensions and avoiding the impacts among different dimension adjustments.

In some embodiments of the present application, both the first rail 203 and the second rail 218 are provided in a radial direction of the light-pipe component 202. Thus, when the light-pipe adjusting apparatus is provided in the optical path, by moving the light-pipe component 202 along the first rail 203 and the second rail 218, it is convenient to adjust the incident position of the light beam in the light-pipe component 202, ensuring the light-homogenizing effect of light-pipe component 202 on the light beam.

In some embodiments of the present application, the first rail 203 is provided in a vertical direction as illustrated by the arrows in FIG. 5, and the second rail 218 is provided in a horizontal direction which is perpendicular to the arrows in FIG. 5. Thus, when the light-pipe adjusting apparatus is provided in the optical path, by moving the light-pipe component 202 in the vertical and horizontal directions, the incident position of the light beam in the light-pipe component 202 can be easily adjusted, ensuring the light-homogenizing effect of light-pipe component 202 on the light beam.

In some embodiments of the present application, the second drive device 213 may include a second rotation member, and the second rotation member is rotationally connected to the second support 212 and is in contact with the first support 201. The second rotation member can rotate with respect to the second support 212 for driving the first support 201 to slide along the second rail 218. The first support 201 slides along the second rail 218 via the rotation of the second rotation member, facilitating the structure of the second drive device 213 and making the second drive device 213 simple in operation and reliable in driving.

In some embodiments of the present application, a first support 201 is provided with a second rack 214, and the second rack 214 is arranged in parallel with the second rail 218. The second rotation member includes a second shaft 215 and a second gear 216, and the second gear 216 sleeves on the second shaft 215 and meshes with the second rack 214. The second shaft 215 is provided perpendicularly to the second rail 218, and the second gear 216 is rotationally connected to the second support 212 via the second shaft 215. When the second gear 216 rotates about the second shaft 215, the second gear 216 drives the first support 201 to slide along the second rail 218, and the stripes of the second gear 216 are perpendicular to the second rail 218. Therefore, by rotating the second gear 216, the first support 201 can slide along the second rail 218, to adjust the position of the light-pipe component 202, simplifying the structure of the second drive device 213 and making the second drive device 213 simple in operation and reliable in driving.

In some embodiments of the present application, a first support 201 is provided with a nut, and an axial direction of the nut is arranged in parallel with the second rail 218. The second rotation member includes a lead screw and a bearing Herein, the lead screw penetrates the bearing, the lead screw is arranged in parallel with the second rail 218, and the lead screw is rotationally connected to the second support 212 via the bearing. The screw is screwed to the nut and rotates about its own axis, hereby driving the first support 201 to slide along the second rail 218. Therefore, the first support 201 can slide along the second rail 218 as long as rotating the screw, to adjusting the position of the light-pipe component 202, simplifying the structure of the second drive device 213 and making the second drive device 213 simple in operation and reliable in driving.

In some embodiments of the present application, the second rotation member includes a third shaft and a cam. The cam sleeves on the third shaft, the third shaft is arranged perpendicularly to the second rail 218, the cam is rotationally connected with the first support 201 via the third shaft, and the cam is located on one side of the first support 201. The cam can rotate about the third shaft to be in contact with and make force on the second support 212, thereby driving the first support 201 to slide along the second rail 218. Therefore, the first support 201 can slide along the second rail 218 as long as rotating the cam, to adjusting the position of the light-pipe component 202, simplifying the structure of the first support 201 and making the first drive device 204 simple in operation and reliable in driving.

In some embodiments of the present application, the light-pipe adjusting apparatus may further include a second positioning bolt 217 and a second positioning member 226, where the second positioning member 226 is provided on the second support 212 via the second positioning bolt 217. The second gear 216 is fixed relative to the second shaft 215 and rotationally connected to the second support 212. The second positioning bolt 217 can extend and contract in a radial direction of the second shaft 215, allowing the second positioning member 226 to support the second rotation shaft 215, and to position the second shaft 215 relative to the second support 212. Thus, following the position adjustment of the light-pipe component 202, the second shaft 215 can be positioned relative to the second support 212 by tightening the second positioning bolt 217, thereby to position the second gear 216 relative to the second support 212, further to position the first support 201 relative to the second support 212, and furthermore to position the light-pipe component 202 relative to the second support 212.

In some embodiments of the present application, the second rail 218 may include a second dovetail joint 227 and a second dovetail groove 228, where the second dovetail joint 227 is slidably provided within the second dovetail groove 228. Herein, the second dovetail joint 227 may be provided on the first support 201 and the second dovetail groove 228 may be provided on the second support 212, or the second dovetail joint 227 may be provided on the second support 212 and the second dovetail groove 228 may be provided on the first support 201. The separation of the first support 201 from the second support 212 can be prevented by the limit action of the second dovetail joint 227 and the second dovetail groove 228, thereby enhancing the reliability of the light-pipe adjusting apparatus.

Illustratively, taking the second dovetail joint 227 being provided on the first support 201, the second dovetail groove 228 being provided on the second support 212, the second rotation member including a second shaft 215 and a second gear 216, and the first support 201 including a first support member 220, a second support member 221 and a third support member 222 as example, as one possible implementation, another surface of the third support member 222 of the first support 201, which is away from the first support member 220 and the second support member 221, is provided with the second dovetail joint 227, a surface of the second support 212, which is opposite to the third support member 222, is provided with the second dovetail groove 228, and the third support member 222 slides along the second dovetail groove 228 via the second dovetail joint 227. Another surface of the third support member 222, which is away from the first support member 220 and the second support member 221, is provided with a second rack 214. A second groove 229 adapting to the second rotation member is provided on another surface of the second support 212, which is away from the third support member 222, and the second groove 229 is perpendicular to the second dovetail groove 228. When the second rotation member is provided on the second support 212 via the second groove 229, the second support 212 is provided with a second through hole 230 at a position corresponding to the second gear 216 of the second rotation member, thereby meshing the second gear 216 with the second rack 214 via the second through hole 230. Thus, the first support 201 can slide along the second dovetail groove 228 as long as rotating the second gear 216, thereby adjusting the position of the light-pipe component 202 and simplifying the structure of the second support 212.

Figure 6:
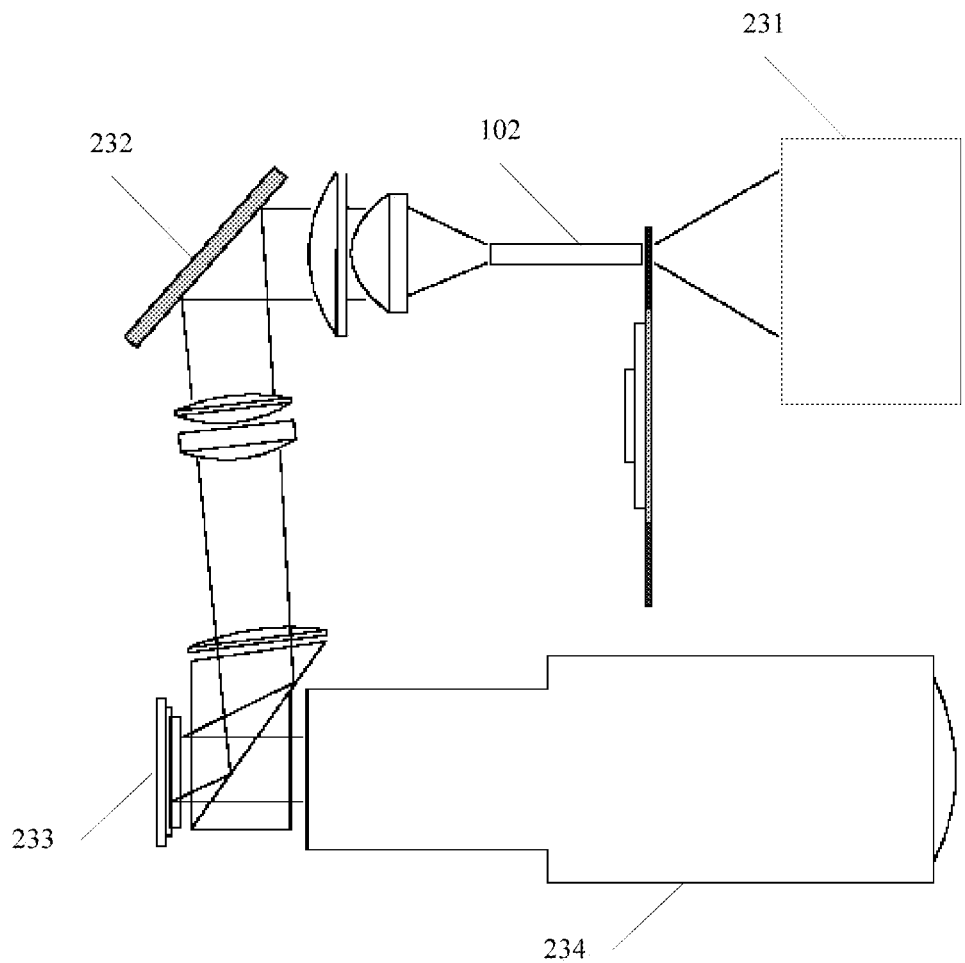
FIG. 6 is a schematic structural diagram of an optical-mechanical system provided in some embodiments of the present application.

FIG. 6 is a schematic structural diagram of an optical-mechanical system provided in some embodiments of the present application. As shown in FIG. 6, some embodiments of the present application provide an optical-mechanical system including a light source optical structure 231, a light-pipe component 202 (not shown) including a light-pipe 102, a reflector 232, a digital micromirror device (DMD) 233, a projection lens 234 and a light-pipe adjusting apparatus (not shown).

The light-pipe adjusting apparatus adjusts the position of the light-pipe component 202 according to the light-outputting position of the light source optical structure 231, thereby causing the light beam emitted from the light source optical structure 231 to enter into the light-pipe 102 for homogenizing. The homogenized light beam enters into the illuminating optical path of the DMD 233 via the reflector 232, so as to enter into the projection lens 234 via the illuminating optical path of the DMD 233.

When the light-pipe component deviates from the predetermined position, or when the light-outputting position of the light source optical structure is adjusted, the optical-mechanical system of the embodiment of the present application can adjust the position of the light-pipe component via the light-pipe adjusting apparatus, thereby allowing the light-pipe component to accurately move along the designed path without deflecting, and improving the accuracy and reliability of the position adjustment of the light-pipe component. The implementation thereof is similar to that of the light-pipe adjusting apparatus described in the above embodiments, and will not be repeated here.

Lastly, it should be noted that the foregoing embodiments are merely intended for explaining, rather than limiting, the technical solutions of the present disclosure. Although the present disclosure is explained in detail with reference to the foregoing embodiments, persons of ordinary skill in the art should understand that it remains possible to make modifications to the technical solutions described in the foregoing embodiments, or make equivalent replacements to some of the technical features therein, and these modifications or replacements do not make the essence of corresponding technical solutions depart from the spirit and scope of the technical solutions in the embodiments of the present disclosure.

What is claimed is:

1. A light-pipe adjusting apparatus, comprising:
    a first support;
    a light-pipe component, slidably connected to the first support via a first rail;
    a first drive device, provided on the first support and connected to the light-pipe component for driving the light-pipe component to slide along the first rail.

2. The light-pipe adjusting apparatus according to claim 1, wherein the first drive device comprises a first rotation member, the first rotation member is rotationally connected to the first support and is in contact with the light-pipe component, and the first rotation member is rotatable relative to the first support for driving the light-pipe component to slide along the first rail.

3. The light-pipe adjusting apparatus according to claim 2, wherein the light-pipe component comprises a protective sleeve; the protective sleeve is provided in a manner of sleeving on a light-pipe of the light-pipe component, thereby allowing the light-pipe component to slide along the first rail via the protective sleeve; the protective sleeve is provided with a first rack arranged in parallel with the first rail, and stripes of the first rack are perpendicular to the first rail;
    the first rotation member comprises a first shaft and a first gear, wherein the first gear is provided in a manner of sleeving on the first shaft and meshing with the first rack, the first shaft is perpendicular to the first rail, the first gear is rotationally connected to the first support via the first shaft, and when the first gear rotates about the first shaft, the first gear drives the light-pipe component to slide along the first rail via the first rack.

4. The light-pipe adjusting apparatus according to claim 3, further comprising: a first positioning bolt and a first positioning member, wherein the first positioning member is provided on the first support via the first positioning bolt;
    the first gear is fixed relative to the first shaft and rotationally connected to the first support, and the first positioning bolt is used to extend and contract in a radial direction of the first shaft, thereby allowing the first positioning member to contact and hold the first shaft and to position the first shaft relative to the first support.

5. The light-pipe adjusting apparatus according to claim 3, further comprising a second support and a second drive device, wherein the first support is slidably connected to the second support via a second rail, the second rail is perpendicular to the first rail, and the second drive device is provided on the second support and connected to the first support for driving the first support to slide along the second rail.

6. The light-pipe adjusting apparatus according to claim 5, wherein the first rail and the second rail are provided in a radial direction of the light-pipe component.

7. The light-pipe adjusting apparatus according to claim 6, wherein the first rail is arranged in a vertical direction and the second rail is arranged in a horizontal direction.

8. The light-pipe adjusting apparatus according to claim 5, wherein the second drive device comprises a second rotation member rotationally connected to the second support and in contact with the first support, and the second rotation member is rotatable relative to the second support for driving the first support to slide along the second rail.

9. The light-pipe adjusting apparatus according to claim 8, wherein the first support is provided with a second rack arranged in parallel with the second rail;
the second rotation member comprises a second shaft and a second gear, the second gear is provided in a manner of sleeving on the second shaft and meshing with the second rack, the second shaft is perpendicular to the second rail, the second gear is rotationally connected to the second support via the second shaft, and when the second gear rotates about the second shaft, the second gear drives the first support to slide along the second rail via the second rack, and stripes of the second rack are perpendicular to the second rail.

10. The light-pipe adjusting apparatus according to claim 9, further comprising: a second positioning bolt and a second positioning member provided on the second support via the second positioning bolt;
wherein the second gear is fixed relative to the second shaft and rotationally connected to the second support, and the second positioning bolt is capable of extending and contracting in a radial direction of the second shaft, thereby allowing the second positioning member to support the second shaft and to position the second shaft relative to the second support.

11. The light-pipe adjusting apparatus according to claim 9, wherein the first support comprises: a first support member, a second support member, and a third support member; the first rail comprises a first dovetail groove and a first dovetail joint;
a surface of the third support member is provided with the first support member and the second support member parallel to each other, the first dovetail groove is provided on a surface of the first support member opposite to the second support member and on a surface of the second support member opposite to the first support member, a position of the first dovetail groove on the first support member is same as a position of the first dovetail groove on the second support member, the protective sleeve is provided with the first dovetail joint corresponding to the first dovetail groove, and the light-pipe component is capable of sliding along the first dovetail groove via the first dovetail joint;
another surface of the first support member away from the second support member is provided with a first groove adapting to the first rotation member, and the first groove and the first dovetail groove are perpendicular to each other; when the first rotation member is provided on the first seat via the first groove, the first support member is provided with a first through hole at a position corresponding to the first gear of the first rotation member, so that the first gear meshes with the first rack on the protective sleeve via the first through hole.

12. The light-pipe adjusting apparatus according to claim 11, wherein the protective sleeve comprises: a hollow sleeve body; the sleeve body sleeves on the light-pipe;
a surface of the sleeve body opposite to the first support member is provided with the first dovetail joint corresponding to the first dovetail groove on the first support member, and a surface of the sleeve body opposite to the second support member is provided with the first dovetail joint corresponding to the first dovetail groove on the second support member;
the first rack is provided on a surface of the sleeve body corresponding the first support member at a position corresponding to the first through hole.

13. The light-pipe adjusting apparatus according to claim 11, wherein the second rail comprises: a second dovetail groove and a second dovetail joint;
another surface of the third support member away from the first support member and the second support member is provided with the second dovetail joint, a surface of the second support opposite to the third support member is provided with the second dovetail groove, and the third support member is capable of sliding along the second dovetail groove via the second dovetail joint;
another surface of the third support member away from the first support member and the second support member is provided with the second rack; and another surface of the second support away from the third support member is provided with a second groove adapting to the second rotation member, wherein the second groove and the second dovetail groove are perpendicular to each other; when the second rotation member is provided on the second support via the second groove, the second support is provided with a second through hole at a second gear of the second rotation member, thereby allowing the second gear to mesh with the second rack via the second through hole.

14. An optical-mechanical system, comprising: a light source optical structure, a reflector, a digital micro-mirror device (DMD), a projection lens, and a light-pipe adjusting apparatus;
wherein the light-pipe adjusting apparatus comprises:
a first support;
a light-pipe component, slidably connected to the first support via a first rail;
a first drive device, provided on the first support and connected to the light-pipe component for driving the light-pipe component to slide along the first rail;
wherein the light-pipe adjusting apparatus is configured to adjust position of the light-pipe component according to light-outputting position of the light source optical structure, thereby allowing a light beam emitted from the light source optical structure to enter into a light-pipe of the light-pipe component for homogenizing;
the homogenized light beam enters into the illuminating optical path of the DMD via the reflector, so as to enter into the projection lens via the illuminating optical path of the DMD.

* * * * *